US012705814B2

(12) United States Patent
Xu et al.

(10) Patent No.: US 12,705,814 B2
(45) Date of Patent: Aug. 11, 2026

(54) MOTION PICTURE GENERATION METHOD AND APPARATUS, AND COMPUTER DEVICE, AND STORAGE MEDIUM

(71) Applicant: Beijing Zitiao Network Technology Co., Ltd., Beijing (CN)

(72) Inventors: Guozhi Xu, Beijing (CN); Di Tang, Beijing (CN); Hao Jiang, Beijing (CN); Xiang Wen, Beijing (CN); Jiaqing Zhou, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 107 days.

(21) Appl. No.: 18/832,904

(22) PCT Filed: Feb. 14, 2023

(86) PCT No.: PCT/CN2023/075885
§ 371 (c)(1),
(2) Date: Jul. 24, 2024

(87) PCT Pub. No.: WO2023/155775
PCT Pub. Date: Aug. 24, 2023

(65) Prior Publication Data

US 2025/0148679 A1 May 8, 2025

(30) Foreign Application Priority Data

Feb. 17, 2022 (CN) ........................ 202210147933.8

(51) Int. Cl.
*G06T 13/40* (2011.01)
*G06T 7/73* (2017.01)
*G06T 19/20* (2011.01)

(52) U.S. Cl.
CPC ................ *G06T 13/40* (2013.01); *G06T 7/75* (2017.01); *G06T 19/20* (2013.01); *G06T 2207/30201* (2013.01); *G06T 2219/2004* (2013.01)

(58) Field of Classification Search
CPC ........... G06T 13/40; G06T 7/75; G06T 17/00; G06T 17/20; G06T 19/00; G06T 19/20;
(Continued)

(56) References Cited

U.S. PATENT DOCUMENTS 7,751,599 B2 * 7/2010 Chen ...................... G06T 13/40 382/192
9,314,692 B2 * 4/2016 Konoplev .............. A63F 13/10
(Continued)

FOREIGN PATENT DOCUMENTS

CN 105844276 A 8/2016
CN 109395390 A 3/2019
(Continued)

OTHER PUBLICATIONS

International Patent Application No. PCT/CN2023/075885; Int'l Search Report; dated Apr. 29, 2023; 2 pages.
(Continued)

*Primary Examiner* — Vijay Shankar
(74) *Attorney, Agent, or Firm* — BakerHostetler

(57) ABSTRACT

The present disclosure provides a motion image generation method and apparatus, and a computer device and a storage medium. The method includes: obtaining a pre-drawn target face model; selecting, from a basic face library, at least one basic face model that is matched with the target face model, and determining an initial face model based on skeleton parameters and a skin matrix which respectively correspond to the at least one basic face model; and iteratively adjusting the skeleton parameters of the initial face model based on the
(Continued)

initial face model and the target face model to obtain reference skeleton parameters when an error between the initial face model and the target face model is smallest, wherein the reference skeleton parameters are used for producing and generating each frame of images when the target face model moves.

18 Claims, 5 Drawing Sheets

(58) Field of Classification Search
CPC . G06T 5/60; G06T 30/27; G06T 2207/20084; G06T 2207/30201; G06T 2219/2004; G06V 10/82; G06V 40/165
See application file for complete search history.

(56) References Cited

U.S. PATENT DOCUMENTS

| | | | | |
|---|---|---|---|---|
| 11,100,709 | B2* | 8/2021 | Chen | G06T 13/40 |
| 11,836,943 | B2* | 12/2023 | Xu | G06V 10/764 |
| 2008/0037836 | A1* | 2/2008 | Chen | G06V 40/176 382/103 |
| 2021/0043000 | A1* | 2/2021 | Chen | G06T 19/20 |

FOREIGN PATENT DOCUMENTS

| | | | |
|---|---|---|---|
| CN | 110517340 | A | 11/2019 |
| CN | 110675475 | A | 1/2020 |
| CN | 112419454 | A | 2/2021 |
| CN | 112419485 | A | 2/2021 |
| CN | 112906494 | A | 6/2021 |
| CN | 113255457 | A | 8/2021 |
| CN | 114529640 | A | 5/2022 |
| KR | 2016-0088223 | A | 7/2016 |
| WO | WO 2021/238126 | A1 | 12/2021 |
| WO | WO 2022/021686 | A1 | 2/2022 |

OTHER PUBLICATIONS

Mingyang et al.; "Optimal Key Points for Facial Animation"; Journal of Computer-Aided Design & Computer Graphics; vol. 25 No. 1; Jan. 2013; p. 93-100 (contains English Abstracts).

Sumarsono et al.; "Facial Expression Control of 3-Dimensional Face Model Using Facial Feature Extraction"; Int'l Conf. on Electrical Engineering and Informatics; Jul. 2011; 6 pages.

* cited by examiner

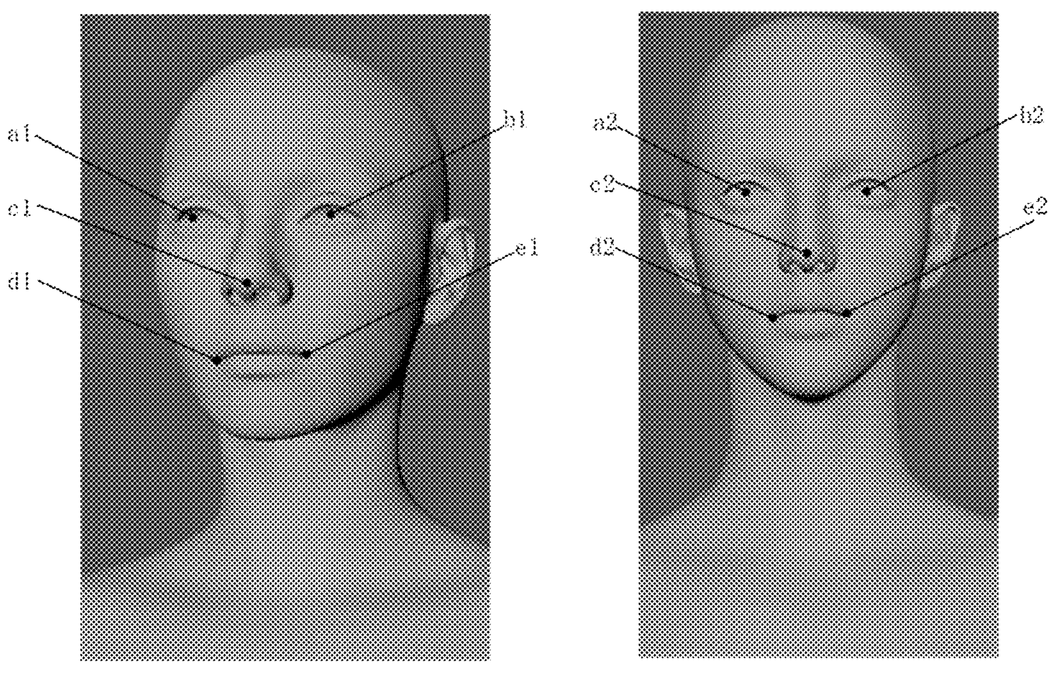
FIG.2a
FIG.2b
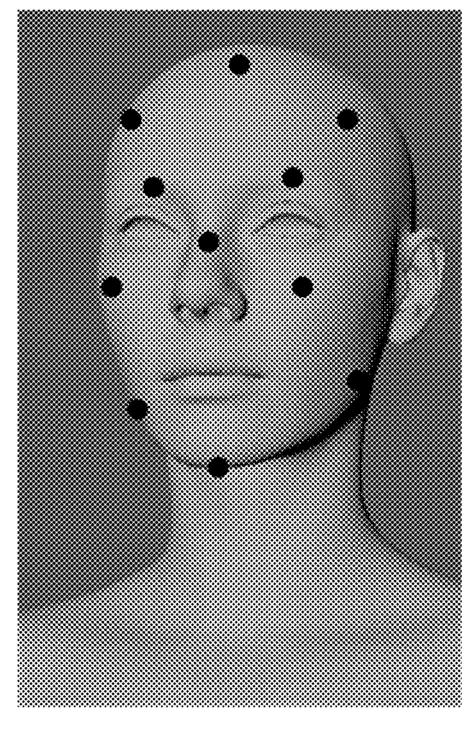
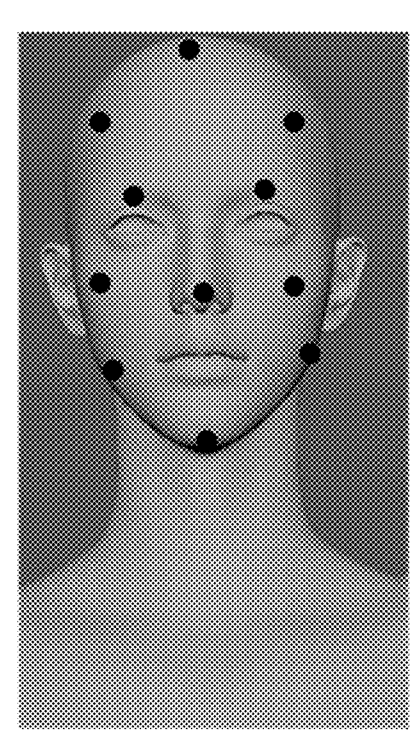
FIG.3a
FIG.3b

MOTION PICTURE GENERATION METHOD AND APPARATUS, AND COMPUTER DEVICE, AND STORAGE MEDIUM

CROSS-REFERENCE TO RELATED APPLICATION(S)

The present disclosure is a national stage application filed under 35 U.S.C. 371 based on International Patent Application No. PCT/CN2023/075885, filed Feb. 14, 2023, which claims priority to Chinese Patent Application No. 202210147933.8, entitled "MOTION PICTURE GENERATION METHOD AND APPARATUS, AND COMPUTER DEVICE, AND STORAGE MEDIUM", filed with the China National Intellectual Property Administration Feb. 17, 2022, the disclosures of which are incorporated by reference in their entities.

FIELD

The present disclosure relates to the technical field of computers, and in particular, to a method and apparatus, and a computer device and a storage medium for motion image generation.

BACKGROUND

Face-creating software usually means that a user changes a face model by adjusting skeleton parameters after building a face skeleton and adding a skin on the face skeleton. Face models in animated characters are usually drawn by working staff with aesthetic and graphic skills using three-dimensional software. If a facial expression of an animated character needs to be changed, and each frame of facial expression images of smooth motion need to be generated, namely, the facial expression is naturally transformed, several groups of skeleton parameters are required.

Since the skeleton parameters of the face model drawn using the three-dimensional software are unknown, it is not possible to obtain the corresponding skeleton parameters using the face-creating software. As a face model includes many vertices, manually adjusting the vertices (e.g., positions of points for connecting skeletons) of the face model to obtain each frame of facial expression images that move smoothly requires high workload and high cost.

SUMMARY

Embodiments of the present disclosure at least provides a method and apparatus, and a computer device and a storage medium for motion image generation.

In a first aspect, the embodiments of the present disclosure provide a method motion image generation, including:

obtaining a pre-drawn target face model;

selecting, from a basic face library, at least one basic face model that is matched with the target face model, and determining an initial face model based on skeleton parameters and a skin matrix which respectively correspond to the at least one basic face model; and iteratively adjusting the skeleton parameters of the initial face model based on the initial face model and the target face model to obtain reference skeleton parameters in response to an error between the initial face model and the target face model being smallest, the reference skeleton parameters are used for producing and generating each frame of images when the target face model moves.

In an alternative implementation, selecting, from a basic face library, at least one basic face model that is matched with the target face model includes:

selecting, from the basic face library, a plurality of candidate face models that are matched with a facial form type of the target face model;

calculating error information between each candidate face model and the target face model based on position information of target points corresponding to the plurality of candidate face models and the target face model respectively; and selecting, from the plurality of candidate face models, the at least one basic face model with the corresponding error information satisfying a preset condition.

In an alternative implementation, the target points include facial key points and model vertices; and calculating error information between each candidate face model and the target face model based on target point position information respectively corresponding to the plurality of candidate face models and the target face model includes:

respectively calculating a first cumulative position error between each candidate face model and the target face model based on position information of a plurality of facial key points respectively corresponding to the plurality of candidate face models and the target face model and position information of a plurality of model vertices respectively corresponding to the plurality of candidate face models and the target face model, and using the first cumulative position error as the error information between the candidate face model and the target face model.

In an alternative implementation, there are a plurality of the at least one basic face model, and the determining an initial face model based on skeleton parameters and a skin matrix which respectively correspond to the plurality of basic face models includes:

performing weighted summation on the skeleton parameters of the various basic face models based on first weight information respectively corresponding to the skeleton parameters of the various basic face models to obtain initial skeleton parameters of the initial face model; performing weighted summation on the skin matrixes of the various basic face models based on second weight information respectively corresponding to the skin matrixes of the various basic face models to obtain an initial skin matrix of the initial face model; and determining the initial face model based on the initial skeleton parameters and the initial skin matrix.

In an alternative implementation, the iteratively adjusting the skeleton parameters of the initial face model based on the initial face model and the target face model to obtain reference skeleton parameters when an error between the initial face model and the target face model is smallest including:

determining a second cumulative position error between the initial face model and the target face model based on position information of a plurality of model vertices respectively corresponding to the initial face model and the target face model; and if the second cumulative position error does not satisfy an iteration cut-off condition, updating the skeleton parameters of the initial face model, updating the initial face model based on the updated skeleton parameters, repeating, for the updated initial face model, the above step of determining the second cumulative position error until the determined second cumulative position error satisfies the iteration cut-off condition, and using the finally updated skeleton parameters as the reference skeleton parameters.

In an alternative implementation, the method further includes:

storing the initial face model finally updated into the basic face library when the iteration cut-off condition is satisfied.

In an alternative implementation, the method further includes:

based on the reference skeleton parameters and a target skeleton parameter in response to the target face model corresponding to the target picture frame reaches a preset pose, generating a plurality of groups of transition skeleton parameters respectively corresponding to a plurality of intermediate image frames between an initial image frame corresponding to the reference skeleton parameters and the target image frame; and generating, based on the reference skeleton parameters and the plurality of groups of transition skeleton parameters, each frames of images corresponding to the target face model reaches the preset pose.

In a second aspect, the embodiments of the present disclosure further provide a motion image generation apparatus, including:

an obtaining module, configured to obtain a pre-drawn target face model;

a first determining module, configured to select, from a basic face library, at least one basic face model that is matched with the target face model, and determine an initial face model based on skeleton parameters and a skin matrix which respectively correspond to the at least one basic face model; and a second determining module, configured to iteratively adjust the skeleton parameters of the initial face model based on the initial face model and the target face model to obtain reference skeleton parameters when an error between the initial face model and the target face model is smallest, the reference skeleton parameters are used for producing and generating each frame of images in response to the target face model moves.

In an alternative implementation, the first determining module is specifically configured to select, from the basic face library, a plurality of candidate face models that are matched with a facial form type of the target face model;

calculate error information between each candidate face model and the target face model based on position information of target points corresponding to the plurality of candidate face models and the target face model respectively; and select, from the plurality of candidate face models, the at least one basic face model with the corresponding error information satisfying a preset condition.

In an alternative implementation, the target points include facial key points and model vertices; and the first determining module is specifically configured to: respectively calculate a first cumulative position error between each candidate face model and the target face model based on position information of a plurality of facial key points respectively corresponding to the plurality of candidate face models and the target face model and position information of a plurality of model vertices respectively corresponding to the plurality of candidate face models and the target face model, and use the first cumulative position error as the error information between the candidate face model and the target face model.

In an alternative implementation, the first determining module is specifically configured to perform weighted summation on the skeleton parameters of the various basic face models based on first weight information respectively corresponding to the skeleton parameters of the various basic face models to obtain initial skeleton parameters of the initial face model; perform weighted summation on the skin matrixes of the various basic face models based on second weight information respectively corresponding to the skin matrixes of the various basic face models to obtain an initial skin matrix of the initial face model; and determine the initial face model based on the initial skeleton parameters and the initial skin matrix.

In an alternative implementation, the second determining module is specifically configured to determine a second cumulative position error between the initial face model and the target face model based on position information of a plurality of model vertices respectively corresponding to the initial face model and the target face model; and if the second cumulative position error does not satisfy an iteration cut-off condition, update the skeleton parameters of the initial face model, update the initial face model based on the updated skeleton parameters, repeat, for the updated initial face model, the above step of determining the second cumulative position error until the determined second cumulative position error satisfies the iteration cut-off condition, and use the finally updated skeleton parameters as the reference skeleton parameters.

In an alternative implementation, the apparatus further includes a storage module, configured to store the initial face model finally updated into the basic face library when the iteration cut-off condition is satisfied.

In an alternative implementation, the apparatus further includes a generation module, configured to based on the reference skeleton parameters and a target skeleton parameter in response to the target face model corresponding to the target picture frame reaches a preset pose, generate a plurality of groups of transition skeleton parameters respectively corresponding to a plurality of intermediate image frames between an initial image frame corresponding to the reference skeleton parameters and the target image frame; and generate, based on the reference skeleton parameters and the plurality of groups of transition skeleton parameters, each frames of images corresponding to the target face model reaches the preset pose.

In a third aspect, the embodiments of the present disclosure further provide a computer device, including a processor, a memory, and a bus, wherein the memory stores machine-readable instructions executable by the processor; when the computer device is run, the processor communicates with the memory through the bus; and the machine-readable instructions, when executed by the processor, execute the steps of the motion image generation method in the first aspect or any possible implementation in the first aspect.

In a fourth aspect, the embodiments of the present disclosure further provide a computer-readable storage medium, having a computer program stored thereon. The computer program, when run by a processor, executes the steps of the motion image generation method in the first aspect or any possible implementation in the first aspect.

Effects of the above motion image generation apparatus, the computer device, and the storage medium are described with reference to the explanation of the above motion image generation method, and will not be elaborated here.

According to the motion image generation method and apparatus, and the computer device and the storage medium provided by the embodiments of the present disclosure, a pre-drawn target face model is obtained; at least one basic face model that is matched with the target face model is selected from a basic face library, and an initial face model is determined based on skeleton parameters and a skin matrix which respectively correspond to the at least one basic face model; and the skeleton parameters of the initial face model are iteratively adjusted based on the initial face model and the target face model to obtain reference skeleton parameters when an error between the initial face model and the target face model is smallest, wherein the reference skeleton parameters are used for producing and generating each frame of images when the target face model moves.

To be specific, the embodiments of the present disclosure can preliminarily obtain, based on a basic face library, at least one basic face model that is similar to a target face model; next, determine an initial face model according to skeleton parameters and a skin matrix respectively corresponding to the at least one basic face model; iteratively adjust the skeleton parameters of the initial face model by using the skin matrix of the initial face model, so as to obtain reference skeleton parameters when an error between the initial face model and the target face model is smallest; and in a later process of producing each frame of images when the target face model moves, generate all the frames of images corresponding to the motion of the target face model by using this group of reference skeleton parameters, namely, achieve facial expressions and actions of the face model, thereby improving the production efficiency of all the frames of images.

To make the above objectives, features, and advantages of the present disclosure more apparent and understandable, the following text provides preferred embodiments. A detailed explanation is made below in conjunction with the accompanying drawings.

BRIEF DESCRIPTION OF THE DRAWINGS

The accompanying drawings are intended to provide a further understanding of the present disclosure and constitute a part of this specification. The accompanying drawings and embodiments of the present disclosure are used together to explain the present disclosure rather than constituting a limitation on the present disclosure. In the drawings:

FIG. 2*a* and FIG. 2*b* show schematic diagrams of comparison of facial key points corresponding to a candidate face model and a target face model according to an embodiment of the present disclosure;

FIG. 3*a* and FIG. 3*b* show schematic diagrams of comparison of model vertices corresponding to a candidate face model and a target face model according to an embodiment of the present disclosure;

DETAILED DESCRIPTION OF EMBODIMENTS

Figure 1:
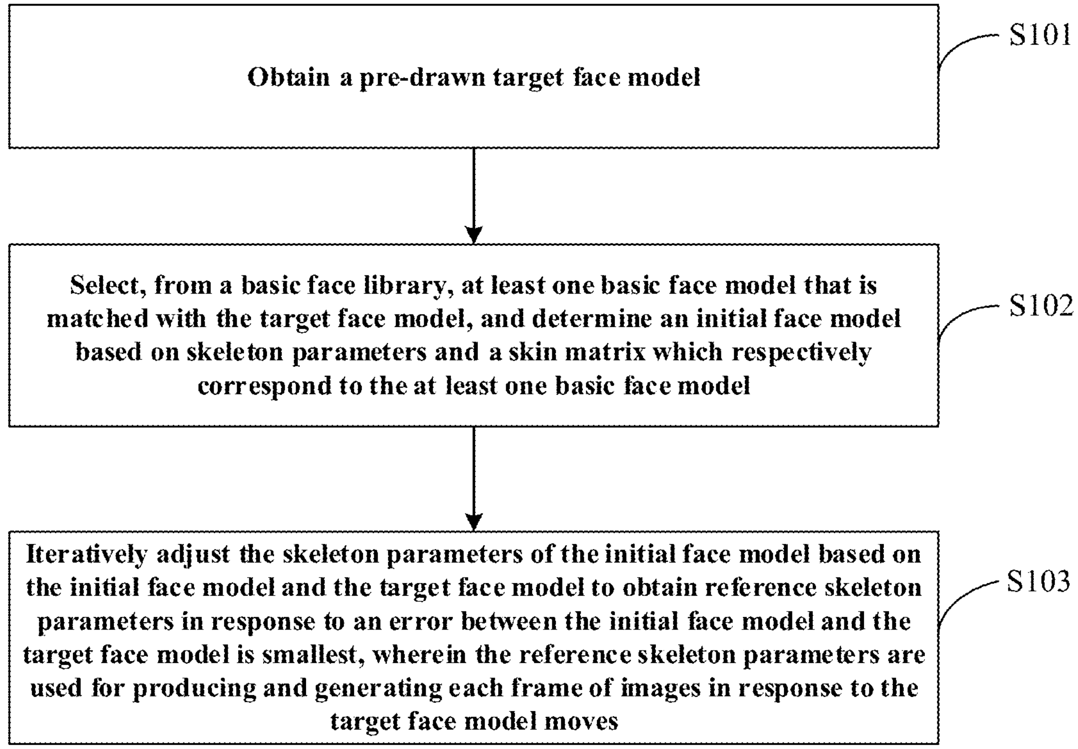
FIG. 1 shows a flowchart of a motion image generation method provided by an embodiment of the present disclosure.

To make the objectives, technical solutions, and advantages of the embodiments of the present disclosure clearer, the technical solutions in the embodiments of the present disclosure are clearly described below with reference to the accompanying drawings in the embodiments of the present disclosure. Apparently, the described embodiments are merely some rather than all of the embodiments of the present disclosure. Assemblies of the embodiments of the present disclosure commonly described and shown in the accompanying drawings here may be arranged and designed in a variety of different configurations. Therefore, the following detailed descriptions of the embodiments of the present disclosure provided in the accompanying drawings are not intended to limit the scope of the claimed present disclosure, but merely represents selected embodiments of the present disclosure. All other embodiments obtained by a person skilled in the art based on the embodiments of the present disclosure without making creative efforts shall fall within the protection scope of the present disclosure.

In addition, the terms "first", "second", and the like in this specification and the claims, as well as the above accompanying drawings in the embodiments of the present disclosure are defined to distinguish similar objects, and do not have to be used to describe a specific order or sequence. It should be understood that such used data is interchangeable where appropriate, so that the embodiments described here can be implemented in an order other than content shown or described here.

The term "plurality or several" mentioned herein means tone or more. The term "and/or" describes an association relationship of associated objects, representing that three relationships may exist. For example, A and/or B may represent three situations: A exists alone; A and B exist simultaneously; and B exists alone. The character "/" usually indicates an "or" relation between associated objects.

It is found via research that face models in animated characters are usually drawn by working staff with aesthetic and graphic skills using three-dimensional software. If a facial expression of an animated character needs to be changed, and each frame of facial expression images that move smoothly need to be generated, namely, the facial expression is naturally transformed, several groups of skeleton parameters are required. At present, a face model drawn by using the three-dimensional software can be changed by manually adjusting vertices of the face model (such as positions of points for connecting skeletons). However, as a face model includes many vertices, manually adjusting the vertices of the face model to obtain each frame of facial expression images that move smoothly requires high workload and high cost.

Based on the above research, the present disclosure provides a motion image generation method, which can preliminarily obtain, based on a basic face library, at least one basic face model that is similar to a target face model; next, determine an initial face model according to skeleton parameters and a skin matrix respectively corresponding to the at least one basic face model; iteratively adjust the skeleton parameters of the initial face model by using the skin matrix of the initial face model, so as to obtain reference skeleton parameters when an error between the initial face model and the target face model is smallest; and in a later process of producing each frame of images when the target face model moves, generate all the frames of images corresponding to the motion of the target face model by using this group of reference skeleton parameters, namely, achieve facial expressions and actions of the face model, thereby improving the production efficiency of all the frames of images.

The defects in the above solutions are all found by the inventor by practice and careful research. Therefore, a finding process of the above problems and the following solutions provided the present disclosure for the above problems should be contributions made by the inventor to the present disclosure in an implementing process of the present disclosure.

It should be noted that similar reference numerals and letters indicate similar items in the following drawings. Therefore, once a certain item is defined in one drawing, it is unnecessary to further define and explain it in the subsequent drawings.

To facilitate understanding of this embodiment, a motion image generation method disclosed by an embodiment of the present disclosure will be introduced in detail first. An executive body of the motion image generation method provided by an embodiment of the present disclosure is generally a computer device with a certain computing ability. In some possible implementations, the motion image generation method may be achieved by a processor by calling computer-readable instructions stored in a memory.

A computer device serving as the executive body is taken as an example below to explain the motion image generation method provided by an embodiment of the present disclosure.

FIG. 1 shows a flowchart of a motion image generation method provided by an embodiment of the present disclosure. The method includes step S101 to step S103.

S101: A pre-drawn target face model is obtained.

In this step, the target face model may be a three-dimensional face model drawn using three-dimensional software, such as an animated character and a game character. Or, the target face model may be obtained by scanning real people using a three-dimensional scanning technology.

S102: At least one basic face model that is matched with the target face model is selected from a basic face library, and an initial face model is determined based on skeleton parameters and a skin matrix which respectively correspond to the at least one basic face model.

The basic face library may include various face models, and different face models may be made in mass based on face-creating software and character attributes.

Each face model corresponds to its own skeleton parameters and skin matrix, and each face model has its own fixed skin matrix. A static face model may be determined based on the skeleton parameters and the skin matrix. To drive a face model to move, a plurality of groups of skeleton parameters of the face model are required, meaning that motion positions of the face model are determined by the skeleton parameters and the skin matrix. A group of skeleton parameters may be composed of position coordinates (namely, three-dimensional (3D) position coordinates) of a plurality of skeletons of the corresponding face model. The position coordinates of the skeletons may include coordinates of a plurality of position points (such as skeleton joint points) that can represent skeleton features. In addition, the skeleton parameters may further include parameters such as a skeleton length. The skin matrix includes a weight value for skin operation based on the position coordinates of the plurality of skeletons of the face model, namely, a skin weight, with a value range of 0 to 1. Each model vertex may be bound to a plurality of skeletons, and the skin weight is equivalent to an action weight of each skeleton on the position of the model vertex. To be specific, the position of the model vertex is equivalent to performing weighted summation on the positions of the corresponding position points of the various skeletons bound to the model vertex.

The following various selection modes (A1 to A2) can be used to select, from a basic face library, at least one basic face model that is matched with the target face model:

A1. The target face model is used as a target. Face models with similar facial features to the target face model may be selected from the basic face library as basic face models that are matched with the target face model.

The facial features may include facial form features and features of the five sense organs.

A1-1. The facial form features are taken as an example. A facial form classifier may be used to determine a facial form type of the target face model. Afterwards, a plurality of basic face models that are matched with the facial form type of the target face model can be selected from the basic face library. The facial form type includes, for example, a square face, a triangular face, an elliptical face, a heart-shape face, and a round face.

A1-2. The features of the five sense organs can also be taken as an example. After the target face model is drawn, a five-sense-organ classifier can be used to determine a type of the five sense organs of the target face model. For example, eye features may include round eyes, triangular eyes, and the like; nose features may include Roman nose, short nose, round nose, triangular nose and the like; and mouth features may include standard lips, pout lips, small round lips, and the like. Afterwards, a plurality of basic face models that are matched with the type of the five sense organs of the target face model can be selected from the basic face library.

A2. First, a plurality of candidate face models that are matched with a facial form type of the target face model may be selected from the basic face library; afterwards, error information between each candidate face model and the target face model is calculated based on position information of target points corresponding to the plurality of candidate face models and the target face model respectively; and the at least one basic face model with the corresponding error information satisfying a preset condition is selected from the plurality of candidate face models.

The process of selecting the candidate face models based on the facial form type can be found in the process of selecting the face models according to the facial form types in A1-1 above.

Exemplarily, the facial form classifier is used to determine the facial form types of the face models in the basic face library. Afterwards, the facial form types are compared with the facial form type of the target face model to determine face models, namely, the candidate face models, that are matched with the facial form type of the target face model.

The target points may include facial key points and/or model vertices.

A deep neural network can be used to locate key points of the five sense organs. For example, a facial landmark algorithm is used to locate the key points of the five sense organs to determine position coordinates corresponding to the facial key points. The position coordinates corresponding to the facial key points are two-dimensional coordinates.

The facial key points may include eye key points, such as the pupils, the left eye corner, and the right eye corner; nose key points, such as the nasal tip, the wings, and the root of the nose; and mouth key points, such as the corners of the mouth, the center of the upper lip, and the center of the lower lip.

In a case of determining a face model, 3D position coordinates of the face model in a three-dimensional space can be obtained. The model vertices may include points, bound to various skeletons, in the head, such as connecting points between the skeletons; and/or, customized 3D coordinate points of the head, such as customized position points on the surface of the head.

A2-1. If the target points only include the facial key points, error information between each candidate face model and the target face model is calculated based on position information of a plurality of facial key points corresponding to the plurality of candidate face models and the target face model respectively; and the at least one basic face model with the corresponding error information satisfying a preset condition is selected from the plurality of candidate face models.

The position information of the facial key points may include two-dimensional position coordinates of the facial key points.

In a specific implementation, one candidate face model is taken as an example. Distance errors between the two-dimensional position coordinates corresponding to the various facial key points of both the candidate face model and the target face model are respectively calculated, and the distance errors between the two-dimensional position coordinates corresponding to the various facial key points are cumulated to obtain a first distance error sum $L_1$. The first distance error sum $L_1$. is used as the error information between the candidate face model and the target face model. If the first distance error sum $L_1$. is less than or equal to a first preset error threshold, the candidate face model can be used as a basic face model.

A calculation formula of the first distance error sum $L_1$. is:

$$L_1 = \sum_i^n |i_1 - i_2|.$$

Where i represents an ith facial key point; $i_1$ represents the position coordinate of the ith facial key point in the candidate face model; $i_2$ represents the position coordinate of the ith facial key point in the target face model; n represents the number of the facial keypoints; and || represents taking an absolute value.

Exemplarily, FIG. 2 shows a schematic diagram of comparison of facial keypoints corresponding to a candidate face model and a target face model according to an embodiment of the present disclosure. FIG. 2*a* is a schematic diagram of the candidate face model, and FIG. 2*b* is a schematic diagram of the target face model. First distance summ=|a1−a2|+|b1−b2|+|c1−c2|+|d1−d2|+|e1−e2|.

A2-2. If the target points only include the model vertices, error information between each candidate face model and the target face model is calculated based on the position information of the model vertices corresponding to the plurality of candidate face models and the target face model respectively; and the at least one basic face model with the corresponding error information satisfying a preset condition is selected from the plurality of candidate face models.

The position information of the model vertices may further include three-dimensional position coordinates of the model vertices.

In a specific implementation, one candidate face model is taken as an example. Distance errors between the three-dimensional position coordinates corresponding to the various model vertices of both the candidate face model and the target face model are respectively calculated, and the distance errors between the three-dimensional position coordinates corresponding to the various model vertices are cumulated to obtain a second distance error sum $L_2$. The second distance error sum $L_2$ is used as the error information between the candidate face model and the target face model. If the second distance error sum $L_2$ is less than or equal to a second preset error threshold, the candidate face model can be used as a basic face model.

A calculation formula of the second distance error sum $L_2$ is:

$$L_2 = \sum_j^m |j_1 - j_2|.$$

Where j represents a jth model vertex; $j_1$ represents the three-dimensional position coordinate of the jth model vertex in the candidate face model; $j_2$ represents the three-dimensional position coordinate of the jth model vertex in the target face model; m represents the number of the model vertices; || and represents taking an absolute value.

Exemplarily, FIG. 3 shows a schematic diagram of comparison of model vertices corresponding to a candidate face model and a target face model according to an embodiment of the present disclosure. FIG. 3*c* is a schematic diagram of the candidate face model, and FIG. 3*d* is a schematic diagram of the target face model. The black dots in the figures represent the model vertices. In a practical application scenario, there are hundred to tens of thousands of model vertices in a face model. Only a few model vertices on the front of the face model are shown in the figures, and most of the model vertices are not shown.

A2-3. If the target points include the facial key points and the model vertices, a first cumulative position error between each candidate face model and the target face model is calculated based on position information of a plurality of facial key points respectively corresponding to the plurality of candidate face models and the target face model and position information of a plurality of model vertices respectively corresponding to the plurality of candidate face models and the target face model, and the first cumulative position error is used as the error information between the candidate face model and the target face model.

The first cumulative position error includes the above first distance error sum $L_1$ and the above second distance error sum $L_2$.

In a case that the first distance error sum $L_1$ and the second distance error sum $L_2$ respectively satisfy the preset conditions, namely, in a case that the first distance error sum $L_1$ is less than or equal to the first preset error threshold, and the second distance error sum $L_2$ is less than or equal to the second preset error threshold, the candidate face model that meets the preset conditions may be used as a basic face model.

The mode for calculating the first cumulative position error (including the first distance error sum $L_1$ and the second distance error sum $L_2$) in A2-3 may be found in A2-1 and A2-2 above. The repetitive parts will not be elaborated here.

In S102, an initial face model is determined based on skeleton parameters and a skin matrix which respectively correspond to the at least one basic face model. In some embodiments, the initial face model determined based on the skeleton parameters and the skin matrix which correspond to one basic face model is the basic face model.

In some other embodiments, if there are a plurality of the at least one basic face model, an initial face model is determined based on skeleton parameters and a skin matrix which respectively correspond to the plurality of basic face models, which includes the following steps:

Step I. Weighted summation is performed on the skeleton parameters of the various basic face models based on first weight information respectively corresponding to the skeleton parameters of the various basic face models to obtain initial skeleton parameters of the initial face model; and weighted summation is performed on the skin matrixes of the various basic face models based on second weight information respectively corresponding to the skin matrixes of the various basic face models to obtain an initial skin matrix of the initial face model.

A calculation formula for the initial skeleton parameters W' of the initial face model may be:

$$W' = \sum_{k}^{R} \theta_k W_k.$$

Where $W_k$ represents the skeleton parameters of a kth basic face model, $k \in [1, R]$; R represents the number of the basic face models; θ represents a weight value indicated by the first weight information, with a value range of 0 to 1; a weight value may be customized according to experience, and this embodiment will not specifically limit this; and $\theta_k$ represents the weight value of the skeleton parameters of the kth basic face model.

Exemplarily, weighted mean summation may be directly performed on the skeleton parameters of the plurality of basic face models to determine the initial skeleton parameters of the initial face model, namely, $$W' = \frac{1}{R} \sum_{k}^{R} W_k.$$

A calculation formula for the initial skeleton parameters G' of the initial face model may be:

$$G' = \frac{1}{R} \sum_{k}^{R} G_k.$$

Where $G_k$ represents the skin matrix of a $^k$th basic face model; γ represents a weight value indicated by the second weight information, with a value range of 0 to 1; a weight value may be customized according to experience, and this embodiment will not specifically limit this; and $\gamma_k$ represents the weight value of the skin matrix of the kth basic face model.

Exemplarily, weighted mean summation may be directly performed on the skin matrixes of the plurality of basic face models to determine the initial skin matrix of the initial face model, namely, $$G' = \frac{1}{R} \sum_{k}^{R} G_k.$$

Step II. The initial face model is determined based on the initial skeleton parameters and the initial skin matrix.

The weight value of each skeleton in the skin matrix is used to weight the initial skeleton parameters of the corresponding skeleton to determine the initial face model.

S103: The skeleton parameters of the initial face model are iteratively adjusted based on the initial face model and the target face model to obtain reference skeleton parameters when an error between the initial face model and the target face model is smallest. The reference skeleton parameters are used for producing and generating each frame of images when the target face model moves.

After the reference skeleton parameters are obtained, this embodiment of the present disclosure produces and generates motion images in various forms based on the reference skeleton parameters, such as a motion video of the target face model, a motion animation, and a plurality of frames of images that can reflect continuous actions.

The initial face model and the target face model may be input to a skeleton parameter inverse calculation model. The skeleton parameter inverse calculation model inversely calculates the skeleton parameters based on a gradient descent method, and iteratively adjusts the skeleton parameters of the initial face model until the reference skeleton parameters suitable for the target face model are obtained. To be specific, if an error between a new face model determined based on the skeleton parameters output by the model and the target face model is the smallest, the skeleton parameters output at this time are used as the reference skeleton parameters.

The skeleton parameter inverse calculation model may be an algorithm model based on optimizer Adam.

In specific implementation, a second cumulative position error between the initial face model and the target face model is determined based on position information of a plurality of model vertices respectively corresponding to the initial face model and the target face model; and if the second cumulative position error does not satisfy an iteration cut-off condition, the skeleton parameters of the initial face model are updated, the initial face model is updated based on the updated skeleton parameters, the above step of determining the second cumulative position error is repeated for the updated initial face model until the determined second cumulative position error satisfies the iteration cut-off condition, and the finally updated skeleton parameters are used as the reference skeleton parameters.

A calculation formula for the second cumulative position error $L_3$ is:

$$L_3 = \sum_{S}^{Q} |s_1 - s_2|.$$

Where s represents an sth model vertex; $s_1$ represents the three-dimensional position coordinate of the sth model vertex in the initial face model; $s_2$ represents the three-dimensional position coordinate of the sth model vertex in the target face model; Q represents the number of the model vertices; and || represents taking an absolute value.

In a case that the second cumulative position error $L_3$ is greater than the third preset error threshold, it is determined that the second cumulative position error does not satisfy the iteration cut-off condition. In this case, the skeleton parameters of the initial face model may be updated to be the skeleton parameters inversely calculated based on the gradient descent method. The updated initial face model may be determined based on the inversely calculated skeleton parameters and the initial skin matrix. For the updated initial face model, a cumulative position error between the updated initial face model and the target face model is calculated according to the calculation formula for the second cumulative position error $L_3$, and whether the iteration cut-off condition is satisfied is further determined. This operation is iteratively performed until the cumulative position error between the updated initial face model and the target face model satisfies the iteration cut-off condition, namely, until the cumulative position error is less than or equal to a third preset error threshold. The corresponding updated skeleton parameters that satisfy the iteration cut-off condition are used as the reference skeleton parameters.

Figure 4:
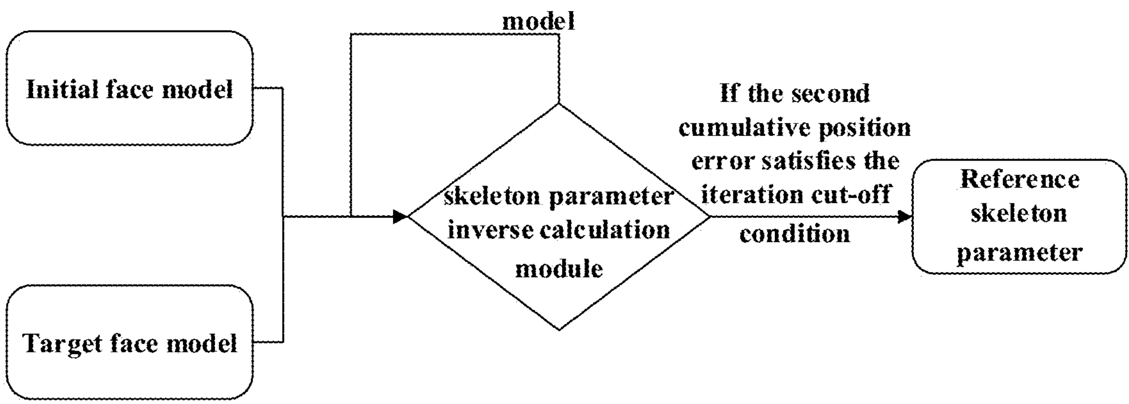
FIG. 4 shows a flowchart of inverse calculation of skeleton parameters according to an embodiment of the present disclosure.

FIG. 4 is a flowchart of inverse calculation of skeleton parameters.

To enrich the face models in the basic face library, the initial face model finally updated may be further stored into the basic face library when the iteration cut-off condition is satisfied.

For the iteration cut-off condition, refer to the above determination of whether the second cumulative position error is less than or equal to the third preset error threshold. Specific data for the third expected error threshold may be set based on experience, and this embodiment of the present disclosure does not specifically limit this.

Figure 5A:
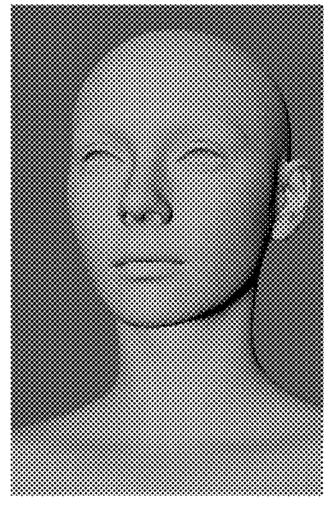
FIG. 5*a*, FIG. 5*b*, and FIG. 5*c* show schematic diagrams of comparative presentation of a candidate face model, a pre-drawn target face model, and a target face model generated based on reference skeleton parameters according to an embodiment of the present disclosure.
Figure 5B:
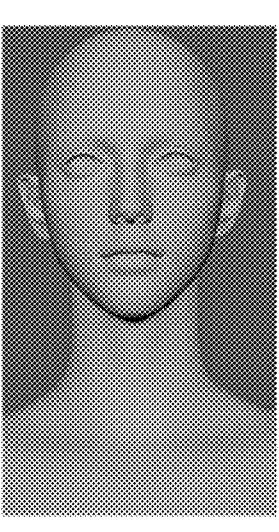
Figure 5C:
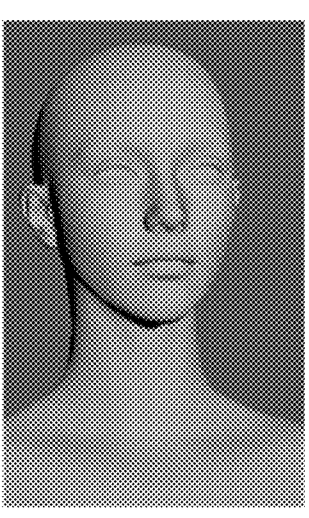

FIG. 5 shows a schematic diagram of comparative presentation of a candidate face model, a pre-drawn target face model, and a target face model generated based on reference skeleton parameters. FIG. 5*e* shows the candidate face model; FIG. 5*f* shows the pre-drawn target face model; and FIG. 5*g* represents the target face model generated based on the reference skeleton parameters. The target face model shown in FIG. 5*g* may be a face model that is determined by using the weight value corresponding to each skeleton in the initial skin matrix to weight the reference skeleton parameters of the corresponding skeleton.

According to S103, in some embodiments, after the reference skeleton parameters of the target face model are determined, based on the reference skeleton parameters and a target skeleton parameter in response to the target face model corresponding to the target picture frame reaches a preset pose, a plurality of groups of transition skeleton parameters respectively corresponding to a plurality of intermediate image frames between an initial image frame corresponding to the reference skeleton parameters and the target image frame are generated. Afterwards, each frame of images corresponding to the target face model being in the preset pose are generated based on the reference skeleton parameters and the plurality of groups of transition skeleton parameters.

The target image frame may be a preset image frame corresponding to the target skeleton parameter when the target face model is in the preset pose. The preset pose may include a preset facial expression (such as smile, surprise, and fear) and a preset action (such as blinking, speaking, and nodding) that are expected to be achieved by the target face model. The target skeleton parameter, for example, may be a skeleton parameter of the target face model when a user uses face-creating software to adjust the target face model to be in the preset pose.

In a specific implementation, a plurality of transition skeleton parameters may be automatically inserted between the reference skeleton parameters and the target skeleton parameter. To be specific, the weight value of each skeleton in the initial skin matrix may be used to weight the transition skeleton parameters of the corresponding skeleton to determine a target face model in the intermediate image frames.

The target face model in the initial image frame may be determined by the reference skeleton parameters and the initial skin matrix. The target face model corresponding to the target image frame may be determined by the target skeleton parameters and the initial skin matrix.

Figure 6:
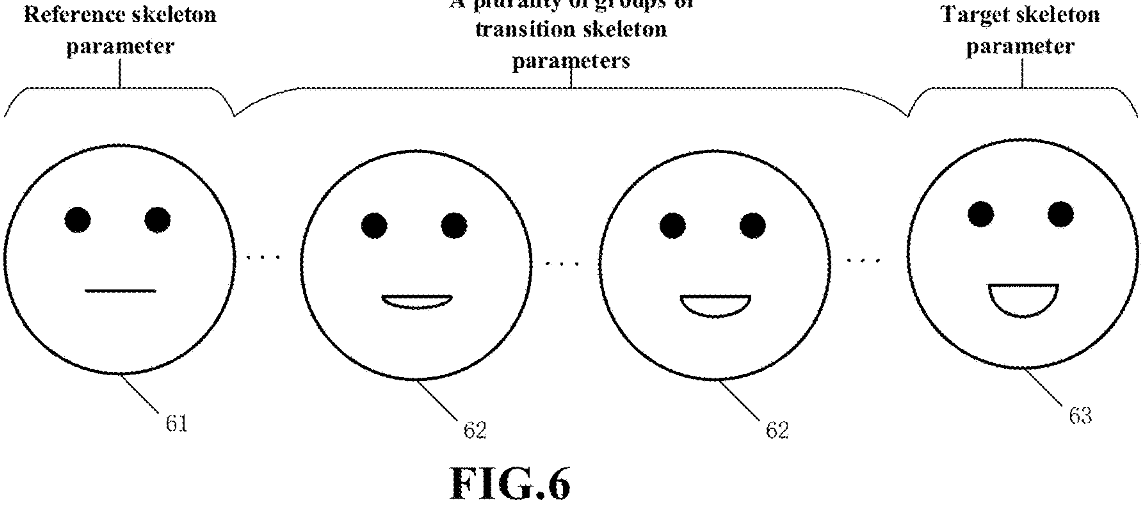
FIG. 6 shows a schematic diagram of presentation of each frame of images corresponding to a target face model being in a preset pose according to an embodiment of the present disclosure.

FIG. 6 shows a schematic diagram of presentation of each frame of images corresponding to a target face model being in a preset pose. All the frames of images generated by an initial image frame 61, intermediate image frames 62, and a target image frame 63 when the target face model being in the preset pose may include, for example, a facial expression animation generated by a 3D character corresponding to the target face model, or a game video generated by a 3D character corresponding to the target face model.

According to S101 to S103 described above, at least one basic face model that is similar to a target face model may be preliminarily obtained based on a basic face library; next, an initial face model may be determined according to skeleton parameters and a skin matrix respectively corresponding to the at least one basic face model; the skeleton parameters of the initial face model are iteratively adjusted by using the skin matrix of the initial face model, so as to obtain reference skeleton parameters when an error between the initial face model and the target face model is smallest; and in a later process of producing each frame of images when the target face model moves, all the frames of images of the motion of the target face model may be generated by using this group of reference skeleton parameters, namely, facial expressions and actions of the face model are achieved, thereby improving the production efficiency of all the frames of images.

A person skilled in the art can understand that in the methods mentioned above of the specific implementations, the writing order of the respective step does not imply a strict execution order and imposes any restrictions on the implementation process. The specific execution order of the respective steps should be determined based on functions and possible internal logics of the steps.

Based on the same inventive concept, the embodiments of the present disclosure further provide a motion image generation apparatus corresponding to the motion image generation method. Since the principle of the apparatus in the embodiments of the present disclosure for solving the problem is similar to the motion image generation method described above in the embodiments of the present disclosure, for the implementation of the apparatus, refer to the implementation of the method. Repetitions will be omitted.

Figure 7:
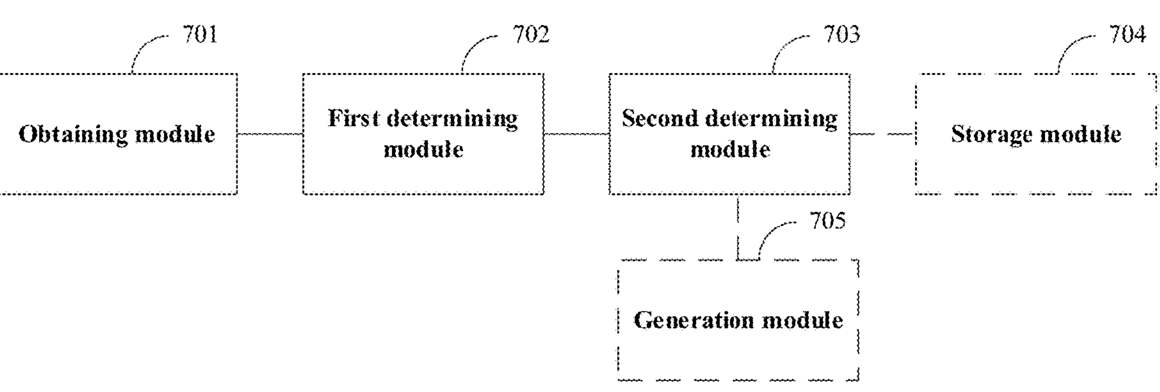
FIG. 7 shows a schematic diagram of a motion image generation apparatus provided by an embodiment of the present disclosure.

FIG. 7 shows a schematic diagram of a motion image generation apparatus provided by an embodiment of the present disclosure. The apparatus includes an obtaining module 701, a first determining module 702, and a second determining module 703.

The obtaining module 701 is configured to obtain a pre-drawn target face model;

the first determining module 702 is configured to select, from a basic face library, at least one basic face model that is matched with the target face model to determine an initial face model based on skeleton parameters and a skin matrix which respectively correspond to the at least one basic face model; and the second determining module 703 is configured to iteratively adjust the skeleton parameters of the initial face model based on the initial face model and the target face model to obtain reference skeleton parameters when an error between the initial face model and the target face model is smallest, the reference skeleton parameters are used for producing and generating each frame of images when the target face model moves.

In an alternative implementation, the first determining module 702 is specifically configured to select, from the basic face library, a plurality of candidate face models that are matched with a facial form type of the target face model;

calculate error information between each candidate face model and the target face model based on position information of target points corresponding to the plurality of candidate face models and the target face model respectively; and select, from the plurality of candidate face models, the at least one basic face model with the corresponding error information satisfying a preset condition.

In an alternative implementation, the target points include facial key points and model vertices; and the first determining module 702 is specifically configured to: respectively calculate a first cumulative position error between each candidate face model and the target face model based on position information of a plurality of facial key points respectively corresponding to the plurality of candidate face models and the target face model and position information of a plurality of model vertices respectively corresponding to the plurality of candidate face models and the target face model, and use the first cumulative position error as the error information between the candidate face model and the target face model.

In an alternative implementation, the first determining module 702 is specifically configured to: perform weighted summation on the skeleton parameters of the various basic face models based on first weight information respectively corresponding to the skeleton parameters of the various basic face models to obtain initial skeleton parameters of the initial face model; perform weighted summation on the skin matrixes of the various basic face models based on second weight information respectively corresponding to the skin matrixes of the various basic face models to obtain an initial skin matrix of the initial face model; and determine the initial face model based on the initial skeleton parameters and the initial skin matrix.

In an alternative implementation, the second determining module 703 is specifically configured to determine a second cumulative position error between the initial face model and the target face model based on position information of a plurality of model vertices respectively corresponding to the initial face model and the target face model; and if the second cumulative position error does not satisfy an iteration cut-off condition, update the skeleton parameters of the initial face model, update the initial face model based on the updated skeleton parameters, repeat, for the updated initial face model, the above step of determining the second cumulative position error until the determined second cumulative position error satisfies the iteration cut-off condition, and use the finally updated skeleton parameters as the reference skeleton parameters.

In an alternative implementation, the apparatus further includes a storage module 704, configured to store the initial face model finally updated into the basic face library when the iteration cut-off condition is satisfied.

In an alternative implementation, the apparatus further includes a generation module 705, configured to based on the reference skeleton parameters and a target skeleton parameter in response to the target face model corresponding to the target picture frame reaches a preset pose, generate a plurality of groups of transition skeleton parameters respectively corresponding to a plurality of intermediate image frames between an initial image frame corresponding to the reference skeleton parameters and the target image frame; and generate, based on the reference skeleton parameters and the plurality of groups of transition skeleton parameters, each frame of images corresponding to the target face model being in the preset pose.

The descriptions of the processing flows of the respective modules in the apparatus and the descriptions of the interaction flows between the modules can refer to the relevant explanations in the above method embodiments, and will not be detailed here.

Figure 8:
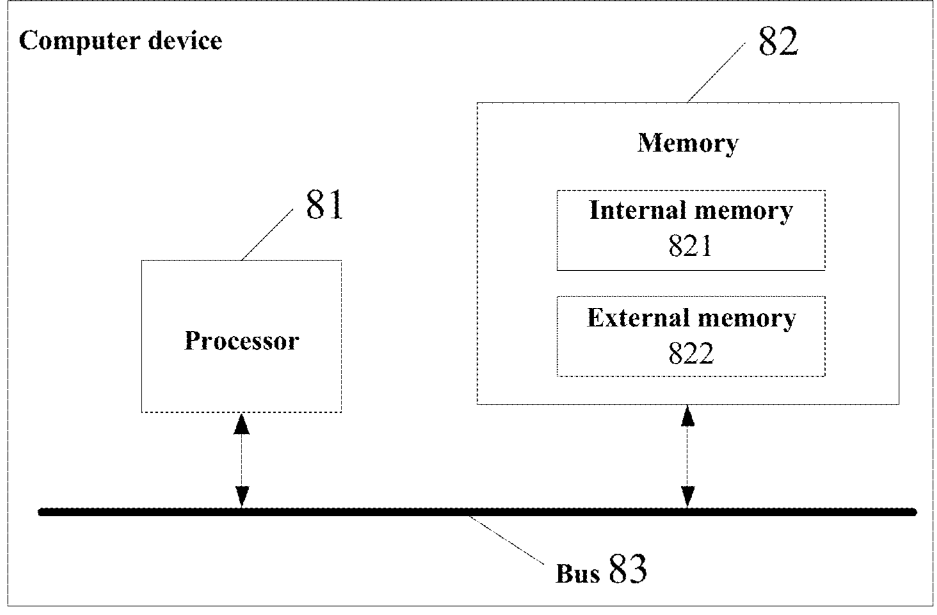
FIG. 8 is a schematic structural diagram of a computer device according to an embodiment of the present disclosure.

Based on the same technical concept, the embodiments of the present disclosure further provide a computer device. FIG. 8 is a schematic structural diagram of a computer device according to an embodiment of the present disclosure, including:

a processor 81, a memory 82, and a bus 83. The memory 82 stores machine-readable instructions executable by the processor 81. The processor 81 is configured to execute the machine-readable instructions stored in the memory 82. When the machine-readable instructions are executed by the processor 81, the processor 81 executes the following steps: S101: a pre-drawn target face model is obtained; S102: at least one basic face model that is matched with the target face model is selected from a basic face library, and an initial face model is determined based on skeleton parameters and a skin matrix which respectively correspond to the at least one basic face model; and S103: the skeleton parameters of the initial face model are iteratively adjusted based on the initial face model and the target face model to obtain reference skeleton parameters when an error between the initial face model and the target face model is smallest, wherein the reference skeleton parameters are used for producing and generating each frame of images when the target face model moves.

The memory 82 includes an internal memory 821 and an external memory 822. The internal memory 821 here, also referred to as an internal memory, is configured to temporarily store operational data in the processor 81 and data exchanged with the external memory 822 such as a hard disk drive. The processor 81 exchanges data with the external memory 822 through the internal memory 821. When the computer device runs, the processor 81 communicates with the memory 82 through the bus 83, causing the processor 81 to execute the executable instructions mentioned in the above method embodiments.

The embodiments of the present disclosure further provide a computer-readable storage medium, having a computer program stored thereon. The computer program, when run by a processor, execute the steps of the motion image generation method in the above method embodiments. The storage medium may be a volatile or a non-volatile computer-readable storage medium.

The embodiments of the present disclosure further provide a computer program product. The computer program product includes computer instructions, and the computer instructions, when executed by a processor, implements the steps of the above motion image generation method. The computer program product may be any product that can implement the above motion image generation method. Some or all of the solutions that contribute to the existing technology in the computer program product can be embodied in the form of a software product (such as a Software Development Kit (SDK)). The software product can be stored in a storage medium, and the included computer instructions enable a relevant device or processor to execute some or all of the steps of the above motion image generation method.

A person skilled in the art can clearly understand that for the convenience and conciseness of the description, for a specific working process of apparatus described above, refer to the corresponding process in the above method embodiments. It will not be elaborated here. In the several embodiments provided by the present disclosure, it should be understood that the disclosed apparatus and method are achieved in other manners. The above-described apparatus embodiments are merely illustrative. For example, the division of the modules is only one type of logical functional division, and other divisions is achieved in practice. For another example, multiple modules or components can be combined, or some features can be omitted, or not executed. In addition, the shown or discussed mutual coupling or direct coupling or communication connection is an indirect coupling or communication connection through some communication interfaces, apparatuses, or modules, and is in an electrical, mechanical or another form.

The units described as separate parts may or may not be physically separate, and parts displayed as units may or may not be physical units, may be in one position, or may be distributed on a plurality of network units. Some or all of the units are selected according to actual needs to achieve the objective of the solution of this embodiment.

In addition, the various functional modules in the various embodiments of the present disclosure may be integrated into one processing module, or each of the modules may exist alone physically, or two or more modules may be integrated into one module.

When the functions are implemented in the form of software functional modules and sold or used as independent products, the functions may be stored in a non-volatile computer-readable storage medium executable by a processor. Based on such an understanding, the technical solutions of the present disclosure essentially, or the part contributing to the prior art, or some of the technical solutions may be presented in the form of a software product. The computer software product is stored in a storage medium, and includes several instructions for instructing a computer device (which may be a personal computer, a server, a network device, or the like) to perform all or some of the steps of the methods of the various embodiments of the present disclosure. The above storage media include: various media that can store program codes, such as a USB flash drive, a mobile hard disk drive, a Read-Only Memory (ROM), a Random Access Memory (RAM), a magnetic disk, and a compact disc.

It should be finally noted that the above embodiments are only specific embodiments of the present disclosure and are intended to explain the technical solutions of the present disclosure, rather than limiting them. The protection scope of the present disclosure is not limited to this. Although detailed explanations have been made to the present disclosure by referring to the above embodiments, a person of ordinary skill in the art should understand that any person skilled in the art can still modify the technical solutions recorded in the aforementioned embodiments or easily think of changes within the scope disclosed by the present disclosure, or equivalently replace some of the technical features. These modifications, changes, or replacements do not separate the essences of the corresponding technical solutions from the spirit and scope of the embodiments of the present disclosure, and should fall within the protection scope of the present disclosure. Therefore, the protection scope of the present disclosure shall be subject to the claims.

We claim:

1. A method for motion image generation, comprising:

obtaining a pre-drawn target face model;

selecting, from a basic face library, at least one basic face model that is matched with the target face model, and determining an initial face model based on skeleton parameters and a skin matrix which respectively correspond to the at least one basic face model; and iteratively adjusting the skeleton parameters of the initial face model based on the initial face model and the target face model to obtain reference skeleton parameters in response to an error between the initial face model and the target face model being smallest, wherein the reference skeleton parameters are used for producing and generating each frame of images in response to the target face model moves, wherein selecting, from the basic face library, the at least one basic face model that is matched with the target face model comprises:

selecting, from the basic face library, a plurality of candidate face models that are matched with a facial form type of the target face model, calculating error information between each candidate face model and the target face model based on position information of target points corresponding to the plurality of candidate face models and the target face model respectively, and selecting, from the plurality of candidate face models, the at least one basic face model with the corresponding error information satisfying a preset condition.

2. The method of claim 1, wherein the target points comprise facial key points and model vertices; and wherein the calculating error information between each candidate face model and the target face model based on target point position information respectively corresponding to the plurality of candidate face models and the target face model comprises:

respectively calculating a first cumulative position error between each candidate face model and the target face model based on position information of a plurality of facial key points respectively corresponding to the plurality of candidate face models and the target face model and position information of a plurality of model vertices respectively corresponding to the plurality of candidate face models and the target face model, and using the first cumulative position error as the error information between the candidate face model and the target face model.

3. The method of claim 1, wherein the at least one basic face model comprises a plurality of basic face models, and determining an initial face model based on skeleton parameters and a skin matrix which respectively correspond to the plurality of basic face models comprises:

performing weighted summation on the skeleton parameters of the various basic face models based on first weight information respectively corresponding to the skeleton parameters of the various basic face models to obtain initial skeleton parameters of the initial face model;

and performing weighted summation on the skin matrixes of the various basic face models based on second weight information respectively corresponding to the skin matrixes of the various basic face models to obtain an initial skin matrix of the initial face model; and determining the initial face model based on the initial skeleton parameters and the initial skin matrix.

4. The method of claim 1, wherein iteratively adjusting the skeleton parameters of the initial face model based on the initial face model and the target face model to obtain reference skeleton parameters in response to an error between the initial face model and the target face model being smallest comprises:

determining a second cumulative position error between the initial face model and the target face model based on position information of a plurality of model vertices respectively corresponding to the initial face model and the target face model; and in response to the second cumulative position error does not satisfy an iteration cut-off condition, updating the skeleton parameters of the initial face model, and updating the initial face model based on the updated skeleton parameters, repeating, for the updated initial face model, the above step of determining the second cumulative position error until the determined second cumulative position error satisfies the iteration cut-off condition, and using the finally updated skeleton parameters as the reference skeleton parameters.

5. The method of claim 4, further comprising:

storing the initial face model finally updated into the basic face library in response to the iteration cut-off condition is satisfied.

6. The method of claim 1, wherein the method further comprises:

based on the reference skeleton parameters and a target skeleton parameter in response to the target face model corresponding to the target picture frame reaches a preset pose, generating a plurality of groups of transition skeleton parameters respectively corresponding to a plurality of intermediate image frames between an initial image frame corresponding to the reference skeleton parameters and the target image frame; and generating, based on the reference skeleton parameters and the plurality of groups of transition skeleton parameters, each frame of images corresponding to the target face model reaches the preset pose.

7. A computing device, comprising a processor, a memory, and a bus, wherein the memory comprises a non-transitory machine-readable medium storing instructions executable by the processor, wherein the instructions, when executed by the processor, cause the computing device to perform operations, the operations comprising:

obtaining a pre-drawn target face model;

selecting, from a basic face library, at least one basic face model that is matched with the target face model, and determining an initial face model based on skeleton parameters and a skin matrix which respectively correspond to the at least one basic face model; and iteratively adjusting the skeleton parameters of the initial face model based on the initial face model and the target face model to obtain reference skeleton parameters in response to an error between the initial face model and the target face model being smallest, wherein the reference skeleton parameters are used for producing and generating each frame of images in response to the target face model moves, wherein selecting, from the basic face library, the at least one basic face model that is matched with the target face model comprises:

selecting, from the basic face library, a plurality of candidate face models that are matched with a facial form type of the target face model, calculating error information between each candidate face model and the target face model based on position information of target points corresponding to the plurality of candidate face models and the target face model respectively, and selecting, from the plurality of candidate face models, the at least one basic face model with the corresponding error information satisfying a preset condition.

8. The computing device of claim 7, wherein the target points comprise facial key points and model vertices; and wherein the calculating error information between each candidate face model and the target face model based on target point position information respectively corresponding to the plurality of candidate face models and the target face model comprises:

respectively calculating a first cumulative position error between each candidate face model and the target face model based on position information of a plurality of facial key points respectively corresponding to the plurality of candidate face models and the target face model and position information of a plurality of model vertices respectively corresponding to the plurality of candidate face models and the target face model, and using the first cumulative position error as the error information between the candidate face model and the target face model.

9. The computing device of claim 7, wherein the at least one basic face model comprises a plurality of basic face models, and the determining an initial face model based on skeleton parameters and a skin matrix which respectively correspond to the plurality of basic face models comprises:

performing weighted summation on the skeleton parameters of the various basic face models based on first weight information respectively corresponding to the skeleton parameters of the various basic face models to obtain initial skeleton parameters of the initial face model;

and performing weighted summation on the skin matrixes of the various basic face models based on second weight information respectively corresponding to the skin matrixes of the various basic face models to obtain an initial skin matrix of the initial face model; and determining the initial face model based on the initial skeleton parameters and the initial skin matrix.

10. The computing device of claim 7, wherein the iteratively adjusting the skeleton parameters of the initial face model based on the initial face model and the target face model to obtain reference skeleton parameters in response to an error between the initial face model and the target face model being smallest comprises:

determining a second cumulative position error between the initial face model and the target face model based on position information of a plurality of model vertices respectively corresponding to the initial face model and the target face model; and in response to the second cumulative position error does not satisfy an iteration cut-off condition, updating the skeleton parameters of the initial face model, and updating the initial face model based on the updated skeleton parameters, repeating, for the updated initial face model, the above step of determining the second cumulative position error until the determined second cumulative position error satisfies the iteration cut-off condition, and using the finally updated skeleton parameters as the reference skeleton parameters.

11. The computing device of claim 10, wherein the operations further comprise:

storing the initial face model finally updated into the basic face library in response to the iteration cut-off condition is satisfied.

12. The computing device of claim 7, wherein the operations further comprise:

based on the reference skeleton parameters and a target skeleton parameter in response to the target face model corresponding to the target picture frame reaches a preset pose, generating a plurality of groups of transition skeleton parameters respectively corresponding to a plurality of intermediate image frames between an initial image frame corresponding to the reference skeleton parameters and the target image frame; and generating, based on the reference skeleton parameters and the plurality of groups of transition skeleton parameters, each frame of images corresponding to the target face model reaches the preset pose.

13. A computer program product tangibly embodied on a non-transitory computer readable storage medium comprising instructions which, when executed by a computer, cause the computer to perform operations, the operations comprising:

obtaining a pre-drawn target face model;

selecting, from a basic face library, at least one basic face model that is matched with the target face model, and determining an initial face model based on skeleton parameters and a skin matrix which respectively correspond to the at least one basic face model; and iteratively adjusting the skeleton parameters of the initial face model based on the initial face model and the target face model to obtain reference skeleton parameters in response to an error between the initial face model and the target face model being smallest, wherein the reference skeleton parameters are used for producing and generating each frame of images in response to the target face model moves, wherein selecting, from the basic face library, the at least one basic face model that is matched with the target face model comprises:

selecting, from the basic face library, a plurality of candidate face models that are matched with a facial form type of the target face model, calculating error information between each candidate face model and the target face model based on position information of target points corresponding to the plurality of candidate face models and the target face model respectively, and selecting, from the plurality of candidate face models, the at least one basic face model with the corresponding error information satisfying a preset condition.

14. The computer program product tangibly embodied on the non-transitory computer readable storage medium of claim 13, wherein the target points comprise facial key points and model vertices; and wherein the calculating error information between each candidate face model and the target face model based on target point position information respectively corresponding to the plurality of candidate face models and the target face model comprises:

respectively calculating a first cumulative position error between each candidate face model and the target face model based on position information of a plurality of facial key points respectively corresponding to the plurality of candidate face models and the target face model and position information of a plurality of model vertices respectively corresponding to the plurality of candidate face models and the target face model, and using the first cumulative position error as the error information between the candidate face model and the target face model.

15. The computer program product tangibly embodied on the non-transitory computer readable storage medium of claim 13, wherein the at least one basic face model comprises a plurality of basic face models, and the determining an initial face model based on skeleton parameters and a skin matrix which respectively correspond to the plurality of basic face models comprises:

performing weighted summation on the skeleton parameters of the various basic face models based on first weight information respectively corresponding to the skeleton parameters of the various basic face models to obtain initial skeleton parameters of the initial face model; and performing weighted summation on the skin matrixes of the various basic face models based on second weight information respectively corresponding to the skin matrixes of the various basic face models to obtain an initial skin matrix of the initial face model; and determining the initial face model based on the initial skeleton parameters and the initial skin matrix.

16. The computer program product tangibly embodied on the non-transitory computer readable storage medium of claim 13, wherein the iteratively adjusting the skeleton parameters of the initial face model based on the initial face model and the target face model to obtain reference skeleton parameters in response to an error between the initial face model and the target face model being smallest comprises:

determining a second cumulative position error between the initial face model and the target face model based on position information of a plurality of model vertices respectively corresponding to the initial face model and the target face model; and in response to the second cumulative position error does not satisfy an iteration cut-off condition, updating the skeleton parameters of the initial face model, and updating the initial face model based on the updated skeleton parameters, repeating, for the updated initial face model, the above step of determining the second cumulative position error until the determined second cumulative position error satisfies the iteration cut-off condition, and using the finally updated skeleton parameters as the reference skeleton parameters.

17. The computer program product tangibly embodied on the non-transitory computer readable storage medium of claim 16, the operations further comprising:

storing the initial face model finally updated into the basic face library in response to the iteration cut-off condition is satisfied.

18. The computer program product tangibly embodied on the non-transitory computer readable storage medium of claim 13, the operations further comprising:

based on the reference skeleton parameters and a target skeleton parameter in response to the target face model corresponding to the target picture frame reaches a preset pose, generating a plurality of groups of transition skeleton parameters respectively corresponding to a plurality of intermediate image frames between an initial image frame corresponding to the reference skeleton parameters and the target image frame; and generating, based on the reference skeleton parameters and the plurality of groups of transition skeleton parameters, each frame of images corresponding to the target face model reaches the preset pose.

* * * * *